United States Patent
Nohara et al.

[11] Patent Number: 5,931,129
[45] Date of Patent: Aug. 3, 1999

[54] VALVE-OPERATING DEVICE FOR ENGINE WITH TWO BANKS AND VARIABLE VALVE TIMING AND WORKING ANGLE MECHANISM

[75] Inventors: Tsuneyasu Nohara; Akira Hidaka, both of Kanagawa; Yoshihiko Yamada, Tokyo, all of Japan

[73] Assignees: Nissan Motor Co., Ltd., Yokohama; Unisia Jecs Corporation, Atsugi, both of Japan

[21] Appl. No.: 09/037,708

[22] Filed: Mar. 10, 1998

[30] Foreign Application Priority Data

Mar. 10, 1997 [JP] Japan ...................... 9-054362

[51] Int. Cl.$^6$ ................................. F01L 13/00
[52] U.S. Cl. ....................... 123/90.17; 123/90.31
[58] Field of Search .............. 123/90.15, 90.17, 123/90.31; 74/568 R

[56] References Cited

U.S. PATENT DOCUMENTS

| | | | |
|---|---|---|---|
| 5,365,896 | 11/1994 | Hara et al. | 123/90.17 |
| 5,557,983 | 9/1996 | Hara et al. | 74/568 |
| 5,592,908 | 1/1997 | Hara et al. | 123/90.17 |
| 5,636,603 | 6/1997 | Nakamura et al. | 123/90.17 |

FOREIGN PATENT DOCUMENTS 57-198306  6/1982  Japan.
6-185321  7/1994  Japan.

Primary Examiner—Wellun Lo
Attorney, Agent, or Firm—Foley & Lardner

[57] ABSTRACT

A valve-operating device for an internal combustion engine equipped with two cylinder banks each having a variable valve timing and working angle mechanism comprises a drive shaft, a cylindrical hollow camshaft fitted to an outer periphery of the drive shaft to be rotatable relatively about the drive shaft, a non-uniform velocity coupling including an annular disc disposed between the drive shaft and the camshaft for transmitting motion of rotation from the drive shaft to the camshaft, permitting a phase change of the camshaft relative to the drive shaft with non-uniform rotation during eccentric motion of the annular disc, and a control housing rotatably supporting the annular disc. Also provided is a decentering mechanism supporting the control housing rockably to produce the eccentric motion of the annular disc. A locus of eccentric motion of the center of the annular disc arranged in the left bank and a locus of eccentric motion of the center of the annular disc arranged in the right bank are essentially symmetrical with respect to the line perpendicular to a line segment between and including two central axes of said drive shafts of the two cylinder banks. A direction of eccentric motion of the center of the annular disc arranged in the right bank is opposite to a direction of eccentric motion of the center of the annular disc arranged in the left bank.

10 Claims, 7 Drawing Sheets

FIG.4
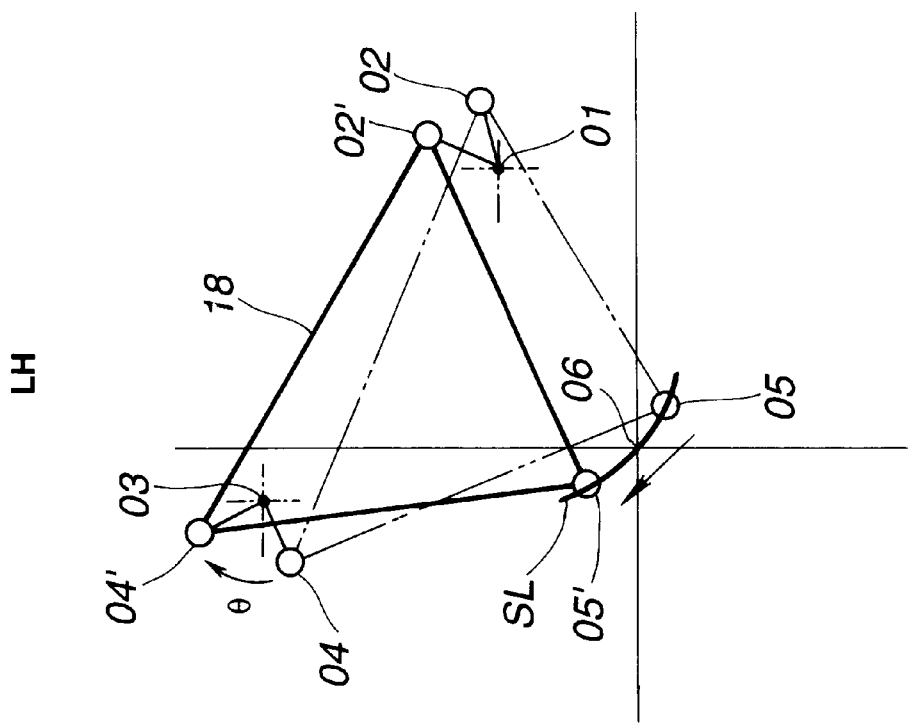
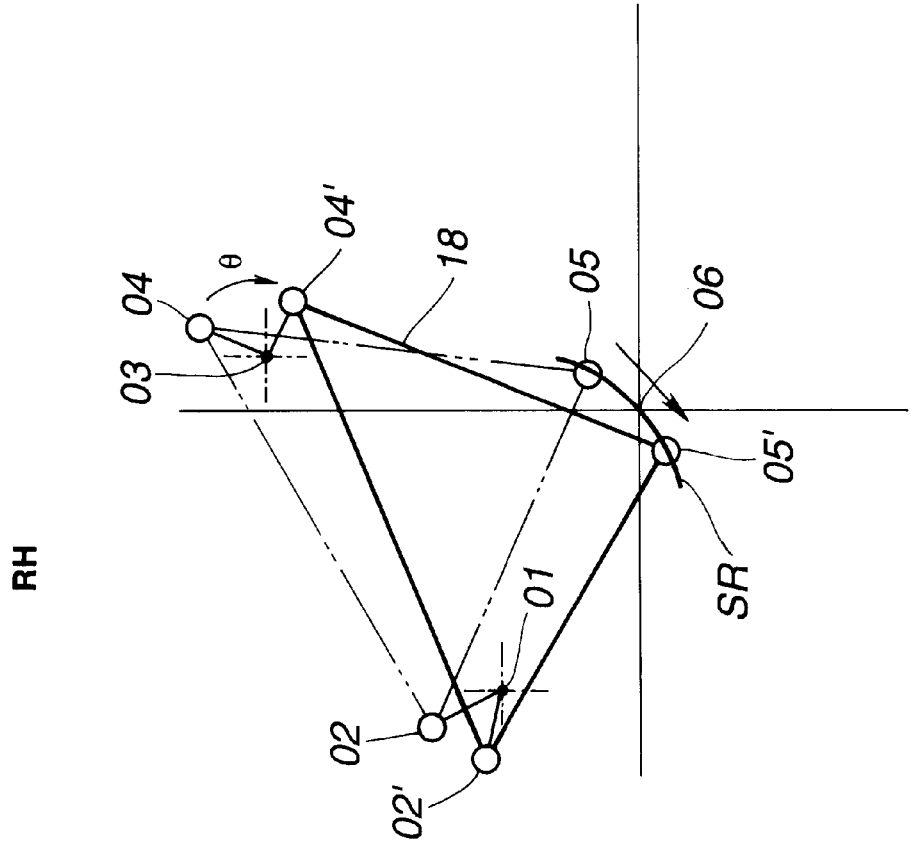

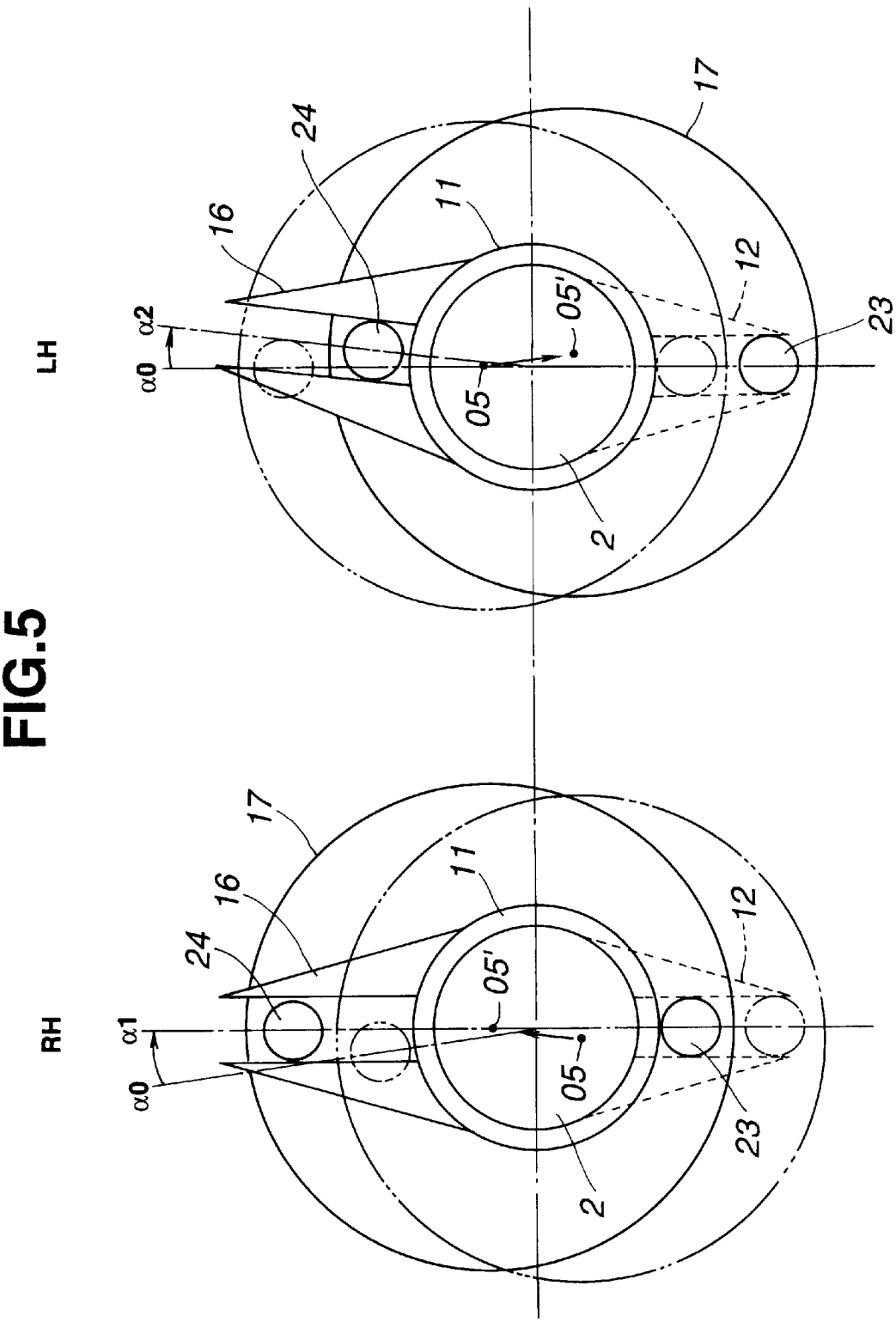

VALVE-OPERATING DEVICE FOR ENGINE WITH TWO BANKS AND VARIABLE VALVE TIMING AND WORKING ANGLE MECHANISM

The contents of Application No. TOKUGANHEI 9-54362, filed Mar. 10, 1997, in Japan is hereby incorporated by reference.

BACKGROUND OF THE INVENTION

1. Field of the Invention

The present invention relates to a valve-operating device for an internal combustion engine equipped with two cylinder banks and a variable valve timing and working angle mechanism, and specifically to a valve-operating device for a two-bank engine with a variable valve timing and working angle mechanism being capable of changing both valve timing and working angle (lifted period or valve-lift characteristic) of intake and/or exhaust valves depending on engine operating conditions by way of non-uniform rotation of a cylindrical hollow camshaft, mounted on the periphery of a drive shaft, about the drive shaft.

2. Description of the Prior Art

In recent years, there have been proposed and developed various types of variable valve timing and working angle mechanism which variably adjusts both valve timing and working angle of intake and/or exhaust valves. One such variable valve timing and working angle mechanism or device has been disclosed in Japanese Utility Model Provisional Publication No. 57-198306 or Japanese Patent Provisional Publication No. 6-185321, each of which employs a principle of a non-uniform velocity joint. In the conventional variable valve timing and working angle devices as disclosed in the Japanese Utility Model Provisional Publication No. 57-198306 and Japanese Patent Provisional Publication No. 6-185321, a cylindrical camshaft is provided on the outer periphery of a drive shaft rotating in synchronization with rotation of the engine. The cylindrical camshaft is divided for every engine cylinders. One shaft end of the divided cylindrical camshaft has a flanged end portion. A flanged sleeve is fixedly connected to the drive shaft, while opposing to the flanged end of the divided camshaft. The flanged end of the divided camshaft has a radial groove, while the flanged end of the sleeve fixed to the drive shaft also has a radial groove, in such a manner that the angular phase of the radial groove formed in the flanged camshaft end is offset from the angular phase of the radial groove formed in the flanged sleeve by 180 degrees. An annular disc is interleaved between the two opposing flanged end faces of the flanged camshaft and the flanged sleeve and has a pair of diametrically-opposing axially-extending pins, each slidably engaging with the associated one of the radial grooves. A so-called control housing is also provided for rotatably receiving the previously-noted annular disc. The control housing is not stationary but displaceable in a direction perpendicular to the axis of the camshaft such that the displacement of the control housing produces eccentric motion of the annular disc relative to the central axis of the cylindrical camshaft (or the drive shaft). Changing the eccentricity of the annular disc to the camshaft varies a valve-lift characteristic. The Japanese Patent Provisional Publication No. 6-185321 also teaches the use of an eccentric cam rotatably fitted to the control housing, to produce the displacement of the control housing in the direction perpendicular to the axis of the camshaft. That is, the eccentric cam is integrally formed with a so-called control shaft parallel to the axis of the camshaft. The control housing is rockably or oscillatingly supported by a support shaft parallel to the axis of the camshaft. The control housing has an eccentric-cam hole into which the eccentric cam is rotatably fitted. The control shaft has a driven connection with an actuator such as a hydraulic actuator. As appreciated, the angular position of the control shaft is adjusted by means of the actuator, thus producing the displacement of the control housing in the direction perpendicular to the associated camshaft. When the previously-discussed conventional variable valve timing and working angle mechanism or device is applied to a V-type engine with two cylinder banks, the layout of the control housings and other component parts is basically symmetric about the engine centerline, since intake and exhaust valves arranged in a first bank of the left and right banks and intake and exhaust valves arranged in a second bank are generally symmetrical with respect to the engine centerline. In the conventional variable valve timing and working angle mechanism, when the central axis of the annular disc is eccentrically displaced from the central axis of the camshaft, the cylindrical camshaft slightly rotates relative to the drive shaft, thus slightly changing the angular phase of the camshaft relative to the drive shaft. This varies a valve timing. As is generally known, in V-type combustion engines, the drive shaft for the camshaft arranged in the left bank and the drive shaft for the camshaft arranged in the right bank rotate in the same rotational direction. Thus, in the conventional device shown in the Japanese Patent Provisional Publication No. 6-185321, when an eccentric motion of an annular disc arranged in the left bank and an eccentric motion of an annular disc arranged in the right bank are symmetrical with respect to the engine centerline due to the symmetrical layout, an angular phase of the camshaft arranged in one cylinder bank varies in a valve-timing advance direction with respect to the angular phase of the associated drive shaft, whereas an angular phase of the camshaft arranged in the other cylinder bank varies in a valve-timing retard direction with respect to the angular phase of the associated drive shaft. As a consequence, valve-lift characteristics of left and right banks slightly differ from each other.

SUMMARY OF THE INVENTION

Accordingly, it is an object of the invention to provide a valve-operating device for an internal combustion engine with two banks and a variable valve timing and working angle mechanism which avoids the aforementioned disadvantages of the prior art.

It is another object of the invention to provide a valve-operating device for an internal combustion engine with two banks and a variable valve timing and working angle mechanism in which a valve-lift characteristic of a first bank of two cylinder banks is essentially equivalent to that of a second bank during variable valve-lift control.

In order to accomplish the aforementioned and other objects of the present invention, a valve-operating device for an internal combustion engine equipped with two cylinder banks each having a variable valve timing and working angle mechanism, comprises a drive shaft adapted to be installed in a cylinder head of each of left and right cylinder banks and being rotatable in a same rotational direction in each bank in synchronization with rotation of an engine crankshaft, a cylindrical hollow camshaft fitted to an outer periphery of the drive shaft to be rotatable relatively about the drive shaft, and divided for every engine cylinders in each bank, a non-uniform velocity coupling including an annular disc disposed between the drive shaft and the camshaft for transmitting motion of rotation from the drive shaft to the camshaft, while permitting a phase change of the camshaft relative to the drive shaft with non-uniform rotation therebetween during eccentric motion of a center of rotation of the annular disc with respect to a center of the drive shaft, a control housing rotatably supporting the annular disc, and a decentering mechanism supporting the control housing rockably along a predetermined locus of motion to produce the eccentric motion of the center of rotation of the annular disc with respect to the center of the drive shaft, wherein a locus of eccentric motion of the center of rotation of the annular disc arranged in the left cylinder bank and a locus of eccentric motion of the center of rotation of the annular disc arranged in the right cylinder bank are essentially symmetrical with respect to a line perpendicular to a line segment between and including two central axes of said drive shafts of the two cylinder banks, and dividing said line segment into two equal parts, and wherein a direction of eccentric motion of the center of rotation of the annular disc arranged in the right cylinder bank is opposite to a direction of eccentric motion of the center of rotation of the annular disc arranged in the left cylinder bank. According to the previously-noted arrangement of the invention, there is no necessity of driving the camshaft drive shafts of the left and right banks in the two opposite rotational directions. That is, it is possible to provide an essentially same valve-lift characteristic in the two banks by driving the drive shafts of the two banks in the same rotational direction by way of a timing chain or a timing belt in the same manner as a typical V-type combustion engine.

The non-uniform velocity coupling may comprise a first flanged portion fixedly connected to one end of the camshaft divided, a second flanged portion fixedly connected to the drive shaft, the first and second flanged portions opposing to each other to sandwich the annular disc therebetween while permitting the eccentric motion of the center of rotation of the annular disc, a pair of radial grooves each formed at either one of the first and second flanged portions and a pair of pins each rotatably connected to either one of the first and second flanged portions and having a projected pin end fitted into the associated radial groove to form a sliding pair which produces the phase change of the camshaft relative to the drive shaft in response to the eccentric motion of the center of rotation of the annular disc. It is preferable that the control housing has a circular eccentric-cam hole and a circular bushing support bore, and additionally, the decentering mechanism comprises a stationary shaft and a rotatable control shaft both arranged parallel to the drive shaft, an eccentric bushing rockably supporting the control housing while permitting a rockable motion of the control housing in a direction perpendicular to an axis of the drive shaft and rotatably fitted into the circular bushing support bore so that an inner peripheral surface of the eccentric bushing is rotatably fitted to the stationary shaft and an outer peripheral surface of the eccentric bushing is rotatably fitted to the circular bushing support bore, and an eccentric cam fixed to the control shaft so that a center of the eccentric cam is eccentric to a center of the control shaft and rotatably fitted into the circular eccentric-cam hole to produce the rockable motion of the control housing in the direction perpendicular to the axis of the drive shaft. More preferably, the control housing arranged in the right cylinder bank has a symmetric shape about the control housing arranged in the left cylinder bank, and also the control housing arranged in the right cylinder bank and the control housing arranged in the left cylinder bank are arranged symmetrically with respect to the line perpendicular to a line segment between and including two central axes of said drive shafts of the two cylinder banks under a particular controlled condition in which the center of rotation of each of the two opposing annular discs arranged laterally in each of the left and right cylinder banks is held in a coaxial position with respect to the center of the drive shaft. In this case, preferably, the control shaft arranged in the right cylinder bank and the control shaft arranged in the left cylinder bank rotate in the same direction of rotation when shifting each of the two opposing annular discs from the particular controlled condition in which the two opposing annular discs are in their coaxial positions.

The camshaft may consist of an intake camshaft being adapted to drive at least one intake valve being arranged toward an inside of each of the left and right cylinder banks, and preferably the control shaft may be arranged above the associated camshaft in each of the cylinder banks, and the stationary shaft may be disposed between the intake camshaft and an exhaust camshaft. More preferably, a predetermined locus of motion of the center of rotation of the annular disc arranged in each of the cylinder banks may be symmetric with respect to a perpendicular line drawn from the center of the drive shaft to a straight line including the center of the stationary shaft and the center of the control shaft with the annular disc held in the coaxial position. To ensure a more superior valve-operating device having essentially uniform valve-lift characteristics (an essentially same phase change in each of the two opposing camshafts in the left and right cylinder banks) in the left and right cylinder banks, it is preferable that an eccentricity of the center of rotation of the annular disc obtained when rotating the control shaft with a positive phase change of a predetermined angle in a rotational direction under the particular controlled condition in which the annular disc is in the coaxial position, is equal to an eccentricity of the center of rotation of the annular disc obtained when rotating the control shaft with a negative phase change of the same value as the predetermined angle in the opposite rotational direction under the particular controlled condition. Preferably, an eccentricity of the eccentric cam to the center of the control shaft is equal to an eccentricity of the eccentric bushing to the center of the stationary shaft to form a four-link parallel link mechanism in conjunction with the control housing. It is more preferable that the center of rotation of the annular disc is designed to be in the coaxial position with respect to the center of the drive shaft when an eccentric direction of the eccentric cam and an eccentric direction of the eccentric bushing are both perpendicular to the straight line. To provide a compact valve-operating device, it is preferable that a center of the outer peripheral surface of the eccentric bushing and a center of the eccentric cam are both arranged toward an inside of the straight line.

BRIEF DESCRIPTION OF THE DRAWINGS

FIG. 4 is an explanatory view showing a motion curve (a locus of motion) of the center (O5) of the annular disc employed in the valve-operating device of the embodiment.

FIG. 5 is an explanatory view showing a change in the angular phase of the camshaft, resulting from eccentric motion of the annular disc.

DESCRIPTION OF THE PREFERRED EMBODIMENTS

Figure 1:
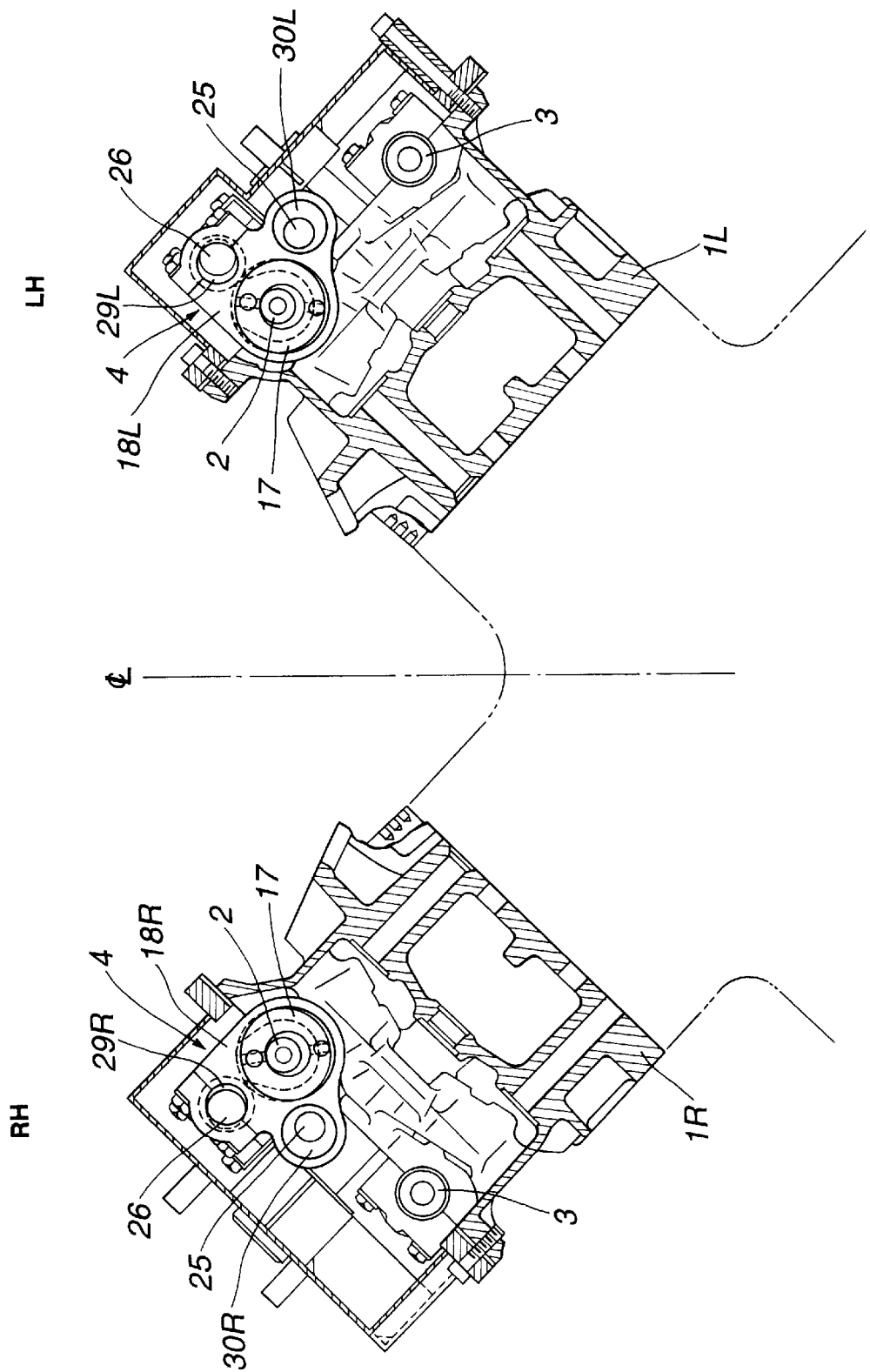
FIG. 1 is a lateral cross-sectional view illustrating left and right cylinder heads of a two-bank engine equipped with a valve-operating device with a variable valve timing and working angle mechanism of one embodiment.
Figure 2:
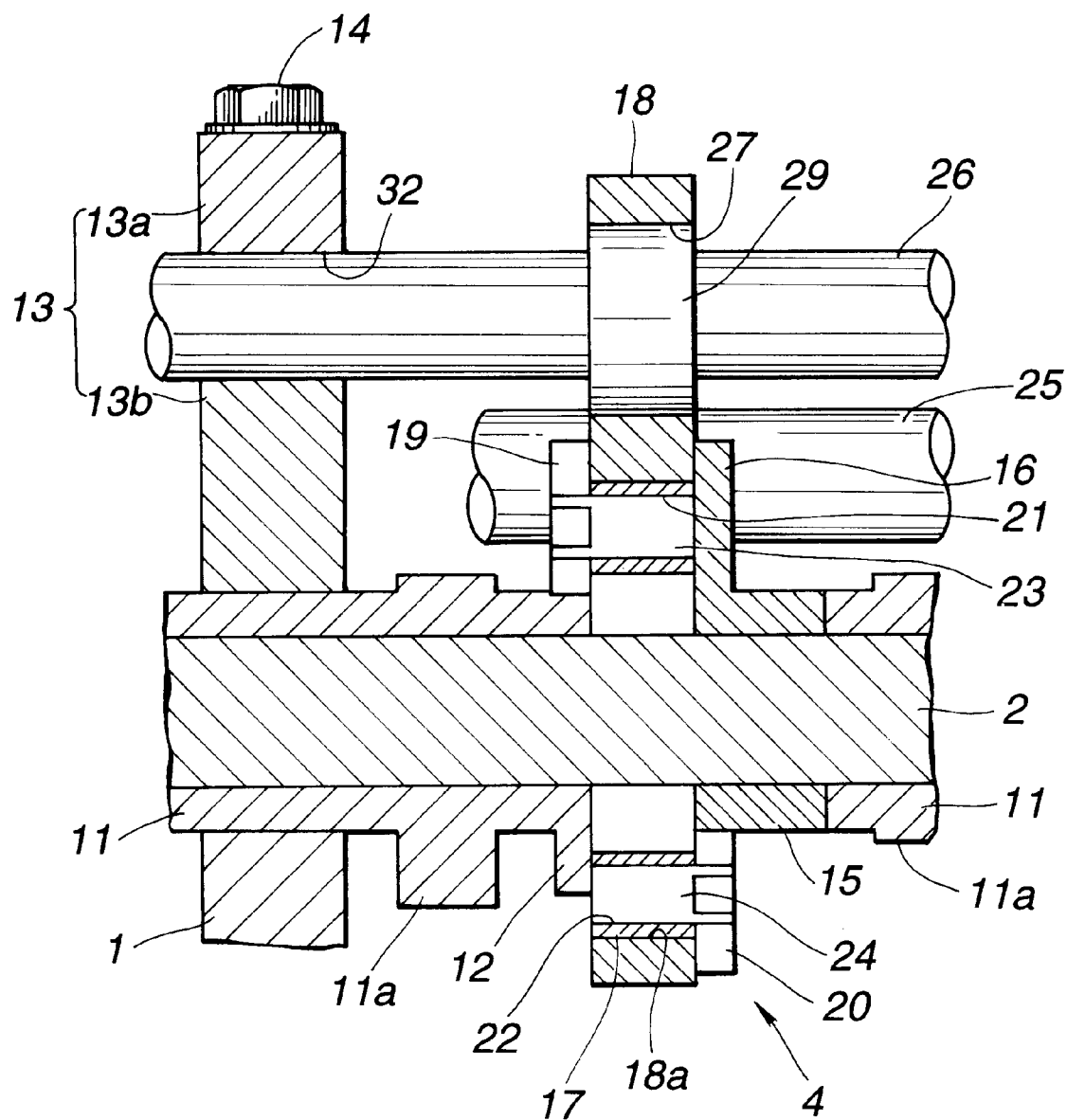
FIG. 2 is a longitudinal cross-sectional view illustrating the essential part of the valve-operating device of the embodiment.
Figure 3:
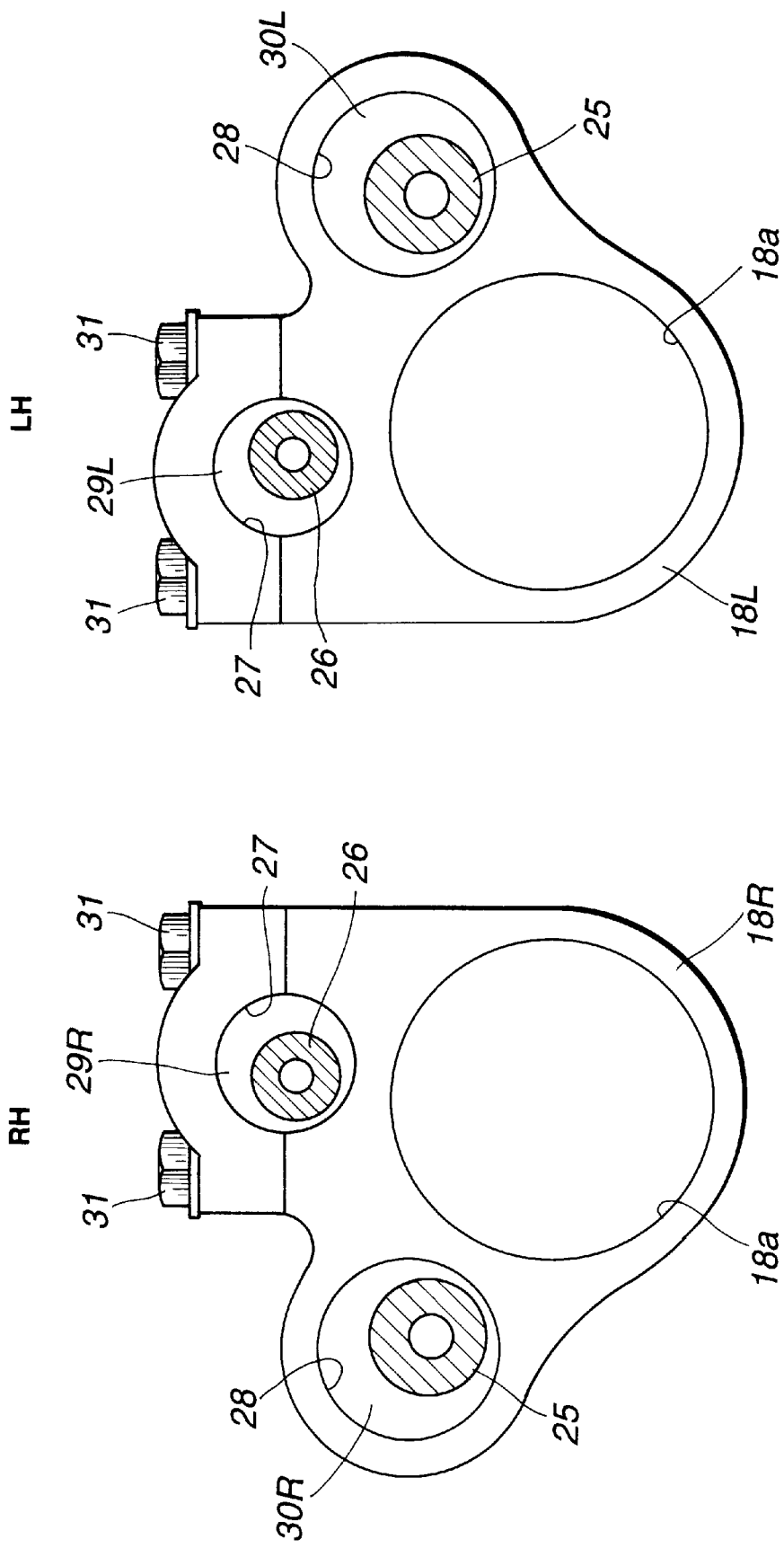
FIG. 3 is a front view for comparison between left and right control housings arranged in left and right banks of the two-bank engine.

Referring now to the drawings, particularly to FIG. 1, the valve-operating device of the invention is exemplified as a valve-operating device with a variable valve timing and working angle mechanism for intake valves employed in a V-type double-overhead-camshaft (DOHC) combustion engine equipped with left and right cylinder banks. As seen in FIG. 1, the V-type engine has a cylinder head 1R arranged in a right bank and a cylinder head 1L arranged in a left bank. A pair of valve-operating devices are located at the respective left and right banks. Basically, the left-hand valve-operating device and the right-hand valve-operating device are symmetrically arranged each other. For the purpose of simplification of the disclosure, the same reference signs used to designate elements shown in the left bank will be applied to the corresponding elements shown in the right bank, and also, in case of necessity for discrimination between left and right banks, the character "L" is added to indicate component parts arranged in the left bank whereas the character "R" is added to indicate component parts arranged in the right bank. As seen in FIG. 1, intake valves are toward the inside of the two banks set at V, whereas exhaust valves are toward the outside of the V-type engine. Reference sign 3 denotes an exhaust camshaft provided for opening and closing exhaust valves arranged in each of the two banks. An intake-camshaft drive shaft 2 is arranged above the intake valves and located parallel to the exhaust camshaft 3 over a plurality of engine cylinders. The exhaust camshaft 3 has a camshaft sprocket (not shown) at its front end, and having a driven connection with the engine crankshaft via a crankshaft sprocket (not shown). The intake-camshaft drive shaft 2, arranged in each of the two banks, has a camshaft sprocket (not shown) at its front end, and having a driven connection with the crankshaft, so that the drive shaft 2 rotates together with the exhaust camshaft 3 via a timing chain (not shown) during rotation of the crankshaft. That is to say, the crankshaft sprocket drives the timing chain, and then the timing chain drives all of the camshafts on each bank. Generally, in V-type engines, the timing belt and sprocket arrangement is symmetric. Thus, a pair of intake-camshaft drive shafts 2 rotate in the same rotational direction. As best seen in FIG. 2, the valve-operating device of the embodiment comprises a variable valve timing and working angle mechanism 4. The variable valve timing and working angle mechanism 4 is provided for every engine cylinders. Referring to FIG. 2, a cylindrical hollow intake camshaft 11 is fitted to the periphery of the intake-camshaft drive shaft 2 to enable the relative rotation to the drive shaft 2. The cylindrical hollow intake camshaft 11 is also divided for every engine cylinders. Each of the divided camshafts 11 is integrally formed at its end with a first flanged portion 12. The intake camshaft 11 is integrally formed with a pair of cams 11a to actuate intake valves (not shown). A journal portion of the intake camshaft 11 is rotatably supported by means of a semi-circular camshaft-journal bearing (not numbered) mounted on the cylinder head 1 (1R, 1L) and a semi-circular cam-shaft journal bearing (not numbered) of a cam bracket 13, serving as a bearing cap. The cam bracket 13 is fixedly connected to the cylinder head 1 by way of a pair of bolts 14. A comparatively short sleeve 15 is fixedly fitted to the periphery of the drive shaft 2. The sleeve 15 is integrally formed at its one end with a flanged portion 16. The flanged portion 16 consists of a second flanged portion opposing to the first flanged portion 12 of the divided camshaft 11. An annular disc 17 is interleaved between the first and second flanged portions 12 and 16. The annular disc 17 is fitted into a comparatively large-diameter circular housing bore 18a of a control housing 18, so that the housing bore 18a of the control housing rotatably receives the annular disc 17. The first flanged portion 12 has a radial groove 19. The second flanged portion 16 has a radial groove 20, so that the angular phase of the radial groove 20 of the second flanged portion 16 is off set from the angular phase of the radial groove 19 of the first flanged portion 12 by 180 degrees. The annular disc 17 has a pair of through-openings 21 and 22 being in radially spaced relationship with each other by 180 degrees. First and second pins 23 and 24 are rotatably fitted into the respective through-openings 21 and 22. The first and second pins 23 and 24 extend axially so that one end of the first pin 23 projects in one axial direction, and that one end of the second pin 24 projects in the opposite axial direction. The projected end of the first pin 23 slidably engages with the radial groove 19 of the first flanged portion 12, while the projected end of the second pin 24 engages with the radial groove 20 of the second flanged portion 16. To ensure proper sliding contact between the projected end of the first pin 23 and the radial groove 19, both sides of the projected end of the first flanged portion 12 has a pair of flattened faces. That is, the both-side flattened, projected pin end of the first pin 23 and the associated radial groove 19 constructs a sliding pair. Likewise, to ensure proper sliding contact between the projected end of the second pin 24 and the radial groove 20, both sides of the projected end of the second flanged portion 16 has a pair of flattened faces. That is, the both-side flattened, projected pin end of the second pin 24 and the associated radial groove 20 constructs another sliding pair. The diametrically opposing two sliding pairs (19, 23; 20, 24) act to convert the eccentric motion of the annular disc 17 into the phase change of the intake camshaft 11 to the drive shaft 2 during the eccentric motion of the annular disc 17. As can be appreciated, the annular disc 17 disposed between the first and second flanged portions, the two sliding pairs (19, 23; 20, 24) cooperate with each other to form a non-uniform velocity coupling which transmits motion of rotation from the drive shaft 2 to the camshaft 11, while permitting the phase change of the camshaft relative to the drive shaft with non-uniform rotation therebetween during the eccentric motion of the center of rotation of the annular disc 17 with respect to the drive shaft 2. The control housing 18, rotatably receiving the annular disc 17, is arranged along a plane perpendicular to the drive shaft 2 and has a disc shape. The shape of the left-bank control housing 18L and the shape of the right-bank control housing 18R are symmetrical about the line perpendicular to a line segment between and including two central axes of said drive shafts of the two cylinder banks. This reduces the number of parts of the valve-operating device. In order to function as a decentering mechanism (or an eccentric-drive mechanism) through which the eccentric motion (off-center motion) of the center of the annular disc with respect to the center of the intake-camshaft drive shaft 2 is produced, the control housing 18 is rockably or oscillatingly supported by means of a stationary shaft 25 and a rotatable control shaft 26, both shafts arranged parallel to the drive shaft 2. Thus, the control housing 18 is displaceable in a direction perpendicular to the axis of the drive shaft 2. As shown in FIG. 3, under a particular condition in which the center of rotation of the annular disc 17 is concentric to the center of the intake-camshaft drive shaft 2 in each cylinder bank, the left-bank control housing 18L and the right-bank control housing 18R are symmetrical with respect to the line perpendicular to a line segment between and including two central axes of said drive shafts of the two cylinder banks. The left control housing 18L has a comparatively small-diameter circular eccentric-cam hole 27 above the large-diameter circular housing bore 18a and has a comparatively medium-diameter circular bushing support bore 28 above the large-diameter circular housing bore 18a off to the left. Similarly, the right-hand control housing 18R has a comparatively small-diameter circular eccentric-cam hole 27 above the large-diameter circular housing bore 18a and has a comparatively medium-diameter circular bush support bore 28 above the large-diameter circular housing bore 18a off to the right. The control shaft 26 and the stationary shaft 25 are respectively inserted into the eccentric-cam hole 27 and the bush support bore 28. The control shaft 26 is integrally formed with a plurality of eccentric cams 29 located for every engine cylinders. The cylindrical outer peripheral surface of the eccentric cam 29 is fitted into the cam hole 27 by way of cam connection (in sliding-contact relationship). On the other hand, an eccentric bush 30 is disposed between the stationary shaft 25 and the bush support bore 28. The eccentric bush 30 has inner and outer cylindrical peripheral surfaces eccentric to each other. The inner peripheral surface of the eccentric bush 30 is rotatably fitted to the stationary shaft 25, while the outer peripheral surface of the eccentric bush 30 is rotatably fitted to the bush support bore 28. With the previously-noted arrangement, when the control shaft 26 is rotated or actuated by an actuator and thus the eccentric cam 29 rotates, the control housing 18 can oscillate or rock up and down (viewing FIGS. 2 and 3) to displace in the direction perpendicular to the intake-camshaft drive shaft 2. The displacement of the control housing 18 produces an eccentric motion of the annular disc 17 with respect to the drive shaft 2 (or the cylindrical hollow intake camshaft 11). As clearly shown in FIG. 3, the control housing 18 is split into two sections, namely an upper eccentric-cam cap section and a lower annular-disc/eccentric-bush support section, by a division plane passing through the center of the circular eccentric-cam hole 27. The upper and lower sections, consisting of the control housing 18, are integrally connected to each other by means of a pair of bolts 31. As best seen in FIG. 2, the previously-noted control shaft 26 is arranged parallel to the drive shaft 2 and extends continually over all of the engine cylinders of each bank. One end of the control shaft 26 has a driven connection with a hydraulic actuator (not shown) such as a hydraulic motor. The actuator may be provided individually for each cylinder bank. Alternatively, a pair of control shafts 26 arranged in the two banks may be driven simultaneously by a single actuator. As seen in FIG. 2, the control shaft 26 is rotatably received by a bearing hole 32 bored in the upper section of the cam bracket 13. More precisely, in the same manner as the control housing, the cam bracket 13 is divided into two sections, namely an upper cap section 13a and a lower journal bearing section 13b, by a division plane passing through the center of the bearing hole 32. Both of the upper and lower bracket sections 13a and 13b are integrally connected to the cylinder head 1 by means of a pair of bolts 14 and are tightened with each other to form cylindrical bearing hole 32. On the other hand, the stationary shaft 25 is divided for every control housings 18. In a V-type eight-cylinder engine, the stationary shaft 25 is divided into four portions. Each of the divided stationary shaft portions act to support the associated control housing 18 via the eccentric bush 30. Each stationary shaft portion is arranged in a substantially central portion of the cylinder head 1, that is, midway between intake and exhaust valves. As briefly discussed above, as shown in FIG. 3, the left and right control housings 18L and 18R are symmetrical about the line perpendicular to a line segment between and including two central axes of said drive shafts of the two cylinder banks, under the particular condition in which the center of rotation of the annular disc 17 is concentric to the center of the intake-camshaft drive shaft 2 in each cylinder bank. The concentric or coaxial position in which the center of the annular disc 17 is in a coaxial or concentric position, will be hereinafter referred to as a "reference position". As seen in FIG. 3, in the reference position, the angular phase of the right-bank eccentric cam 29R and the angular phase of the left-bank eccentric cam 29L are symmetrical with each other, and at the same time the angular phase of the right-bank eccentric bushing 30R and the angular phase of the left-bank eccentric bushing 30L are symmetrical with each other. When the position of the annular disc 17 is changed from concentric to eccentric with eccentric motion of the control housing 18, and thus the annular disc 17 shifts to the eccentric position, the two eccentric cams 29L and 29R arranged in the left and right banks become arranged at their unsymmetrical positions owing to rotation of the two eccentric cams 29L and 29R in the same direction. That is, the valve-operating device of the embodiment is designed so that, when the annular disc 17 arranged in one cylinder bank is moved upward from concentric to eccentric, the annular disc 17 arranged in the other cylinder bank is moved downward from concentric to eccentric, as will be fully described later by reference to a simple mechanism chart shown in FIG. 4. The up and down eccentric motions of the annular discs 17 in the left and right banks ensure the phase change of the intake camshaft 11 arranged in the left bank to be identical to the phase change of the intake camshaft 11 arranged in the right bank, as will be fully described later by reference to the explanatory diagram of FIG. 5 illustrating the principle of the eccentric drive by way of which the phase change of the camshaft is created.

Referring now to FIG. 4, there are shown the eccentric motions of the control housing 18s in the left and right banks. In FIG. 4, O1 denotes the center of the stationary shaft 25, O2 or O2' denotes the center of the outer peripheral circle of the eccentric bushing 30 rotatably supported on the stationary shaft 25, O3 denotes the center of the control shaft 26, O4 or O4' denotes the center of the outer peripheral circle of the eccentric cam 29 fixedly connected to the control shaft 26, O5 or O5' denotes the center of the annular disc 17, and O6 denotes the center of the intake-camshaft drive shaft 2. As regards the right bank (see the left-hand half of FIG. 4), with θ degrees clockwise rotation of the control shaft 26 of the center O3, the central position O4 of the eccentric cam 29R is shifted to the other position or point O4', the central position O2 of the eccentric bushing 30R is shifted to the other position O2', and the central position O5 of the annular disc 17 is shifted to the other position O5'. As a result, in the right bank, the center O5 of the annular disc 17 shifts downward to the position O5' along the motion curve (the locus-of-motion SR) passing through O5 and O5' in the clockwise direction indicated by the arrow. On the contrary, as regards the left bank (see the right-hand half of FIG. 4), with θ degrees clockwise rotation of the control shaft 26 of the center O3, the central position O4 of the eccentric cam 29L is shifted to the other position O4', the central position O2 of the eccentric bushing 30L is shifted to the other position O2', and the central position O5 of the annular disc 17 is shifted to the other position O5'. As a result, in the left bank, the center O5 of the annular disc 17 shifts upwardly to the position O5' along the motion curve (the locus-of-motion SL) passing through O5 and O5' in the clockwise direction indicated by the arrow. Note that the control housing 18 arranged in the right bank shifts downward from the position of a triangle O2-O4-O5 indicated by a two-dotted line to the position of a triangle O2'-O4'-O5' indicated by the solid line (see the left-hand half of FIG. 4), and that the control housing 18 arranged in the left bank shifts upwardly from the position of a triangle O2-O4-O5 indicated by a two-dotted line to the position of a triangle O2'-O4'-O5' indicated by the solid line (see the right-hand half of FIG. 4). That is, the shifting motion of the right-bank control housing 18R and the shifting motion of the let-bank control housing 18L are unsymmetrical with each other. As can be appreciated from comparison between the motion curves SL and SR of the left-hand and right-hand annular discs 17, the two motion curves SL and SR are in symmetrical relationship with each other. Also, as may be appreciated from the left and right motion curves SL and SR, the direction of motion of the center O5 of the annular disc 17L of the left bank is opposite to the direction of motion of the center O5 of the annular disc 17R of the right bank. In other words, although the motion curves SL and SR are symmetric, the centers (O5, O5) of the annular discs 17L and 17R move unsymmetrically.

Referring now to FIG. 5, there is shown the relationship between the phase change of the right-bank intake camshaft 11 resulting from the eccentric motion of the right-bank annular disc 17 and the phase change of the left-bank intake camshaft 11 resulting from the eccentric motion of the left-bank annular disc 17. FIG. 5 shows an example that the center O5 of the right-bank annular disc 17 shifts upward to the position O5' off to the slightly right and that the center O5 of the left-bank annular disc 17 shifts downward to the position O5' off to the slightly right. At this time, assuming that, in the right bank (RH) the second pin 24 shifts upwards from the position indicated by two-dotted line to the position indicated by the solid line off to the slightly right and the first pin 23 moves up vertically, and that in the left bank (LH) the second pin 24 shifts downwards from the position indicated by two-dotted line to the position indicated by the solid line off to the slightly right and the first pin 23 moves down vertically. Under these conditions, the right-bank intake camshaft 11 relatively rotates about its drive shaft 2 clockwise from its initial set position α0 to an angular position α1 with the outward sliding motion of the pin 24 in the radial groove 20 and the inward sliding motion of the pin 23 in the radial groove 19. On the other hand, the left-bank intake camshaft 11 relatively rotates about its drive shaft 2 clockwise from its initial set position α0 to an angular position α2 with the inward sliding motion of the pin 24 in the radial groove 20 and the outward sliding motion of the pin 23 in the radial groove 19. With the arrangement of the embodiment, the right-bank intake camshaft 11 and the left-bank intake camshaft 11 can rotate in the same rotational direction due to the eccentric motions of the annular discs 17 arranged in the left and right banks in the opposite directions. Under a specific condition wherein component parts of the variable valve timing and working angle mechanism 4 of the left bank and component parts of the variable valve timing and working angle mechanism 4 of the right bank are symmetrical about the line perpendicular to a line segment between and including two central axes of said drive shafts of the two cylinder banks when the right-bank annular disc 17R is kept in its reference position (the coaxial position with respect to the right-bank intake-camshaft drive shaft 2) and the left-bank annular disc 17L is also kept in its reference position (the coaxial position with respect to the left-bank intake-camshaft drive shaft 2), the phase change α1 of the right-bank intake camshaft 11 relative to the drive shaft 2 is essentially equivalent to the phase change α2 of the left-bank intake camshaft 11 relative to the drive shaft 2. Thus, the device of the embodiment permits both of the left-bank camshaft 11 and the right-bank camshaft 11 to be advanced with the same phase advance or to be retarded with the same phase retard. Therefore, the valve-lift characteristics of the variable valve-timing and working-angle mechanisms associated with the opposing left and right engine cylinders can be maintained at the same characteristics.

Hitherto, since the direction of motion of the center of the left-bank annular disc and the direction of motion of the center of the right-bank annular disc were same, and thus these centers moved symmetrically, when the right-bank camshaft was displaced relative to its drive shaft in a rotational direction, to the contrary the left-bank camshaft would be displaced relative its drive shaft in the opposite rotational direction by the same phase angle as the relative displacement of the right-bank camshaft, and as a consequence the valve-lift characteristic of a first cylinder bank was advanced whereas the valve-lift characteristic of a second cylinder bank was retarded.

Figure 6A:
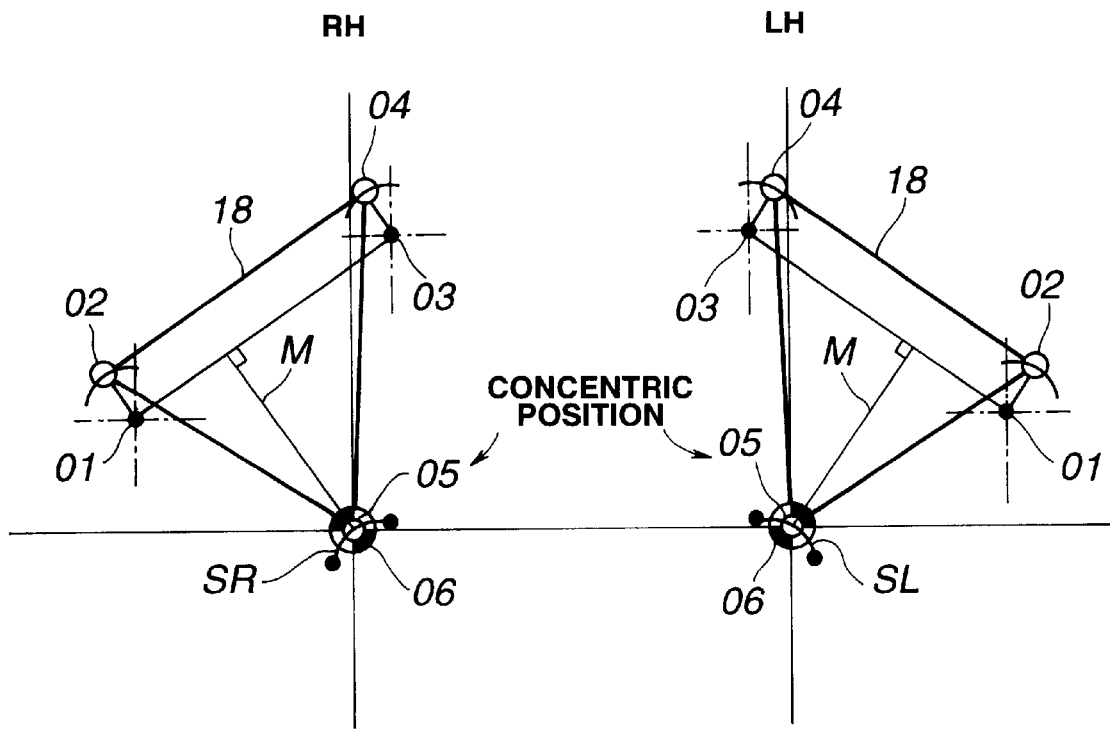
FIG. 6A is an explanatory view showing the construction and state of left and right linkages, each used for a valve-operating device of another embodiment, when the center (O5) of the annular disc is concentric with respect to the center (O6) of the drive shaft.
Figure 6B:
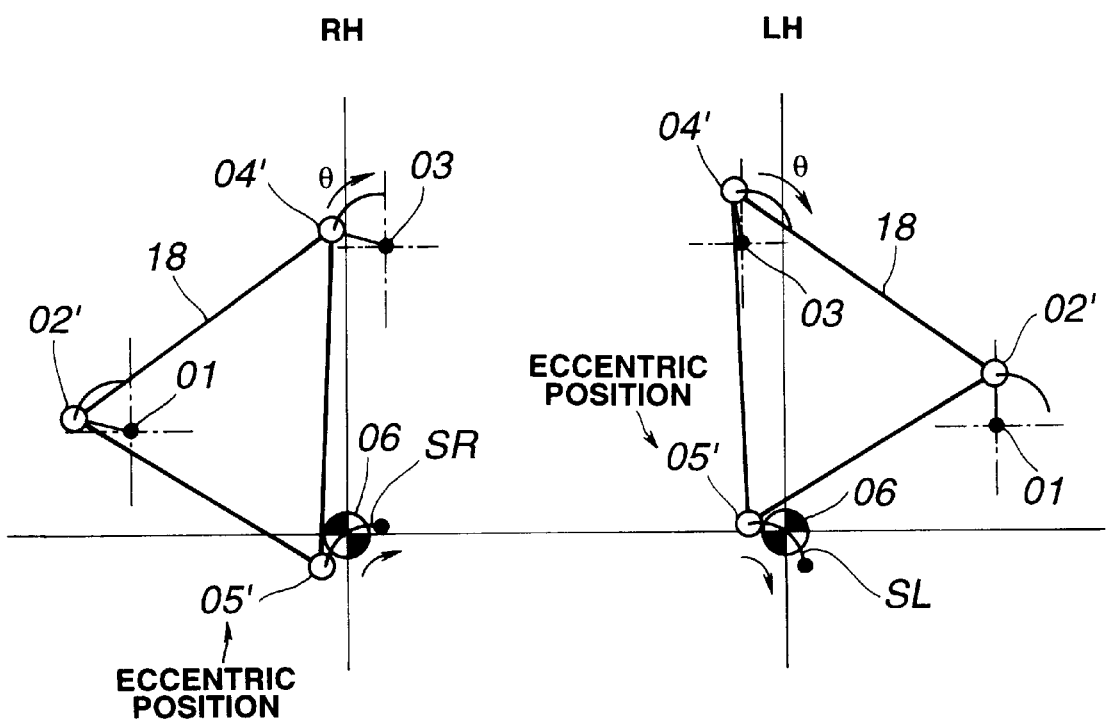
FIG. 6B is an explanatory view showing the construction and state of left and right linkages, each used for a valve-operating device of another embodiment, when the center (O5) of the annular disc is eccentric with respect to the center (O6) of the drive shaft.

Referring now to FIGS. 6A and 6B, there is shown a valve-operating device of another embodiment. In FIGS. 6A and 6B, O1 denotes the center of the stationary shaft 25, O2 or O2' denotes the center of the outer peripheral circle of the eccentric bushing 30 rotatably supported on the stationary shaft 25, O3 denotes the center of the control shaft 26, O4 or O4' denotes the center of the outer peripheral circle of the eccentric cam 29 fixedly connected to the control shaft 26, O5 or O5' denotes the center of the annular disc 17, and O6 denotes the center of the intake-camshaft drive shaft 2. As shown in FIG. 6A, when the center O5 of the right-bank annular disc 17 is kept in the coaxial position (the reference position) with respect to the center O6 of the right-bank intake-camshaft drive shaft 2 and the center O5 of the left-bank annular disc 17 is kept in the coaxial position (the reference position) with respect to the center O6 of the left-bank intake-camshaft drive shaft 2, the right-bank variable valve-timing and working-angle link mechanism 4 and the left-bank variable valve-timing and working-angle link mechanism 4 are arranged symmetrically. The linkage of FIGS. 6A and 6B is designed that, when the right-bank control shaft 26 of the center O3 rotates with a phase change corresponding to a given phase angle in a rotational direction, the left-bank control shaft 26 rotates with the same phase change in the same rotational direction. In FIG. 6A, the line segment (O1, O2) represents the eccentricity of the eccentric bushing 30 from the center O1 of the stationary shaft 25 and the eccentric direction of the eccentric bushing 30. On the other hand, the line segment (O3, O4) represents the eccentricity of the eccentric cam 29 from the center O3 of the control shaft 26 and the eccentric direction of the eccentric cam 29. Note that the eccentricity of the eccentric bushing 30 is equal to the eccentricity of the eccentric cam 29. In the link mechanism shown in FIG. 6A, the distance (O1~O3) between the center O1 of the stationary shaft 25 and the center O3 of the control shaft 26 is designed to be equal to the distance (O2~O4) between the two points O2 and O4 defined by the control housing 18, the eccentric bushing 30 and the eccentric cam 29. That is, the linkage shown in FIG. 6A constructs a four-link parallel link mechanism. The four-link parallel link mechanism of FIGS. 6A and 6B, enables a parallel translation of the control housing 18, which is simply indicated as a triangle O2-O4-O5, along a predetermined motion curve (or a predetermined locus of motion) without any rotation. As seen in FIG. 6A, when the center O5 of the annular disc 17 is kept in the coaxial position (or the reference position) with respect to the center O6 of the drive shaft 2, the line segment (O1, O2) indicative of the eccentric direction of the eccentric bushing 30 and the line segment (O3, O4) indicative of the eccentric direction of the eccentric cam 29 are both perpendicular to the straight line (O1, O3) including the two points O1 (the center of the stationary shaft 25) and O3 (the center of the control shaft 26). In more detail, in the embodiment shown in FIG. 6A, the center O2 of the outer peripheral surface (or the outer peripheral circle) of the eccentric bushing 30 and the center O4 of the outer peripheral surface (or the outer peripheral circle) of the eccentric cam 29 are both arranged toward the outside of the previously-discussed straight line (O1, O3). With the arrangement shown in FIGS. 6A and 6B, as seen in FIG. 6B, when the control shaft 26 of each cylinder bank rotates θ degrees in the direction (clockwise) indicated by the arrow, the center O5 of the right-bank annular disc 17R shifts upwards from the point O5' along the predetermined locus of motion SR, whereas the center O5 of the left-bank annular disc 17L shifts downwards from the point O5' along the predetermined locus of motion SL. In the same manner as the embodiment shown in FIG. 4, the direction of motion of the right-bank annular-disc center O5 on the predetermined locus of motion SR is opposite to the direction of motion of the left-bank annular-disc center O5 on the predetermined locus of motion SL. In the previously-noted four-link parallel link mechanism, in case that the reference position (the coaxial position) of the annular disc 17 is a neutral position of the eccentric motion of the disc 17, each predetermined locus of motion SR or SL is symmetric with respect to a center line M corresponding to a perpendicular line drawn from the point O6 to the straight line (O1, O3) with the disc 17 held in the coaxial position. Also, a range of the eccentric motion of the point O5 is limited to such a specified range that the eccentric motion curve of the point O5 is point-symmetrical with respect to the point O6. Additionally, each predetermined locus of motion SR and SL is a simple circular arc equal to a locus of motion of the point O2 and equal to a locus of motion of the point O4. Thus, the eccentric displacement of the center O5 of the annular disc 17 resulting from the control shaft rotation of a unit angle, is same in each cylinder bank. For example, when each control shaft 26 rotates with a predetermined phase change (or a predetermined phase angle) from the reference position in which the annular disc 17 is in the coaxial position and the control shaft 26 is in its neutral position, the device of the embodiment of FIG. 6A ensures the same eccentricity of the annular disc 17 to the drive shaft 2 in each bank. In this case, the phase change of the left-bank camshaft 11 is precisely identical to that of the right-bank camshaft 11, thus assuring less deviation of the left-bank valve-lift characteristics from the right-bank valve-lift characteristics.

Figure 7:
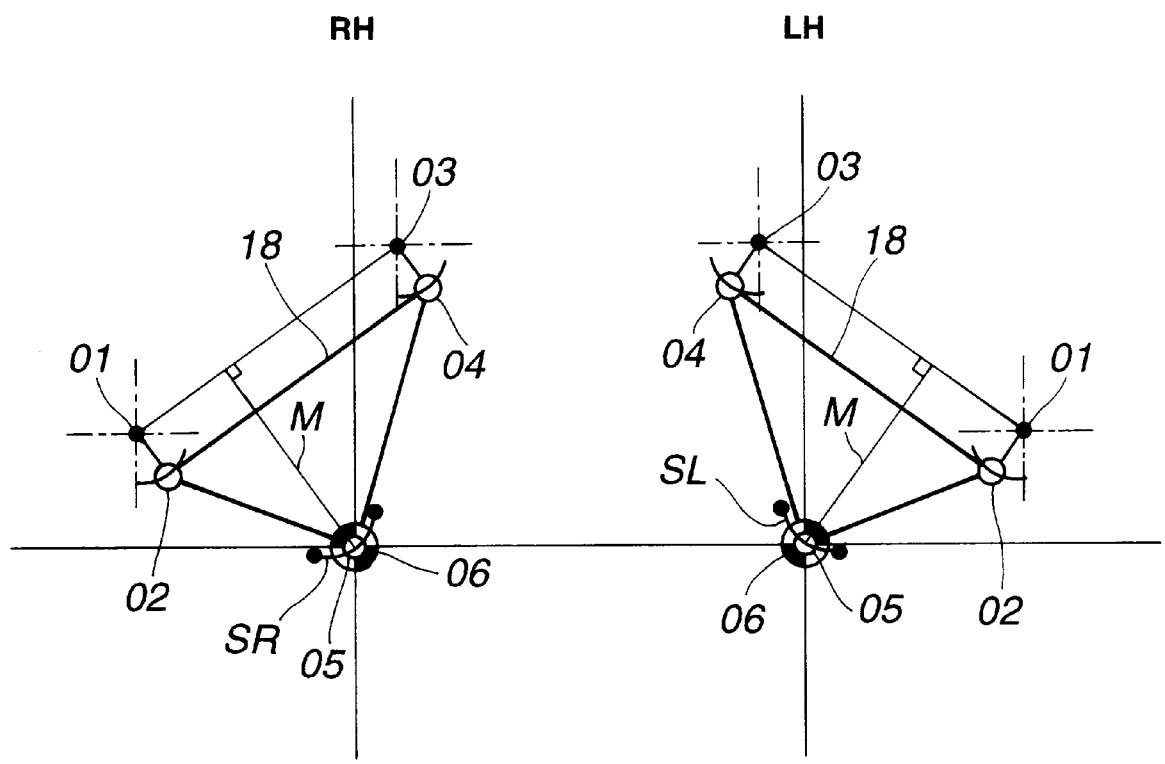
FIG. 7 is an explanatory view showing the construction and state of left and right linkages, each used for a valve-operating device of a further embodiment, when the center (O5) of the annular disc is concentric with respect to the center (O6) of the drive shaft.

Referring now to FIG. 7, there is shown a valve-operating device of a further embodiment. The embodiment shown in FIG. 7 is similar to the embodiment of FIGS. 6A and 6B, and thus the same characters used to be designate the central points O1, O2, O3, O4, O5 and O6 used in the link mechanism shown in FIG. 6A will be applied to the corresponding central points used in the link mechanism shown in FIG. 7, for the purpose of comparison of the two four-link parallel link mechanisms. In more detail, at the point O1, the eccentric bushing 30 (of the center O2) and the stationary shaft 25 (of the center O1) consist of a turning pair. At the point O2, the eccentric bushing 30 (of the center O2) and the control housing 18 consist of a turning pair. At the point O3, the eccentric cam 29 (of the center O4) is in a fixedly connected relationship with the control shaft 26 (of the center O3) and the eccentric cam 29 is rotatable together with the control shaft 26. At the point O4, the eccentric cam 29 (of the center O4) and the control housing 18 consist of a turning pair. Additionally, the distance (O1~O3) between the two centers O1 and O3 is designed to be equal to the distance (O2~O4) between the two centers O2 and O4. Also, the deviation (or the eccentricity) of the center O2 of the outer peripheral circle of the eccentric bushing from the center O1 of the stationary shaft 25, is designed to be equal to the deviation (or the eccentricity) of the center O4 of the eccentric cam 29 from the center O3 of the control shaft 26. Therefore, the link mechanism of FIG. 7 constructs the same four-link parallel link mechanism as the linkage shown in FIG. 6A. As seen in FIG. 7, when the center O5 of the annular disc 17 is kept in the coaxial position (the reference position) with respect to the center O6 of the intake-camshaft drive shaft 2, the two line segments (O1, O2) and (O3, O4) are both perpendicular to the straight line (O1, O3) including two points O1 and O3. Of course, in the four-link parallel link mechanism of FIG. 7, when the reference position (the coaxial position) of the annular disc 17 is a neutral position of the eccentric motion, each predetermined locus of motion SR or SL is symmetric with respect to the perpendicular center line drawn from the point O6 to the straight line (O1, O3) in the coaxial position of the disc 17. In contrast with the outside offset of the two centers O2 and O4 from the straight line (O1, O3) in FIG. 6A, note that the two centers O2 and O4 are both arranged toward the inside of the straight line (O1, O3) in the link mechanism shown in FIG. 7. The inside offset of the two centers O2 and O4 greatly contributes to small-sizing of the valve-operating device.

In the shown embodiments, although a valve-operating device equipped with a variable valve timing and working angle mechanism is used for only intake valves employed in a V-type combustion engine for the sake of illustrative simplicity, it will be appreciated that the valve-operating device of the invention may be applied to exhaust valves usually arranged toward the outside of each of left and right cylinder banks of a V-type engine.

In the shown embodiments, although a valve-operating device of the present invention is exemplified in a V-type combustion engine with two banks and a variable valve timing and working angle mechanism, the device of the invention may be applied to the other two-bank engine such as a horizontally opposed cylinder engine containing a typical flat four cylinder engine, a flat six cylinder engine or the like.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A valve-operating device for an internal combustion engine equipped with two cylinder banks each having a variable valve timing and working angle mechanism, comprising:

a drive shaft (2) adapted to be installed in a cylinder head of each of left and right cylinder banks and being rotatable in a same rotational direction in each bank in synchronization with rotation of an engine crankshaft;

a cylindrical hollow camshaft (11) fitted to an outer periphery of said drive shaft (2) to be rotatable relatively about said drive shaft (2), and divided for every engine cylinder in each bank;

a non-uniform velocity coupling (17, 19, 23, 20, 24) including an annular disc (17) disposed between said drive shaft (2) and said camshaft (11) for transmitting motion of rotation from said drive shaft to said camshaft, while permitting a phase change of said camshaft relative to said drive shaft with non-uniform rotation therebetween during eccentric motion of a center of rotation of said annular disc (17) with respect to a center of said drive shaft (2);

a control housing (18) rotatably supporting said annular disc (17); and a decentering mechanism (25, 26, 29, 30) supporting said control housing (18) rockably along a predetermined locus of motion to produce the eccentric motion of the center of rotation of said annular disc (17) with respect to the center of said drive shaft (2);

wherein a locus of eccentric motion of the center of rotation of said annular disc (17) arranged in the left cylinder bank and a locus of eccentric motion of the center of rotation of said annular disc (17) arranged in the right cylinder bank are essentially symmetrical with respect to a line perpendicular to a line segment between and including two central axes of said drive shafts of the two cylinder banks, and wherein a direction of eccentric motion of the center of rotation of said annular disc (17) arranged in the right cylinder bank is opposite to a direction of eccentric motion of the center of rotation of said annular disc (17) arranged in the left cylinder bank.

2. The valve-operating device as claimed in claim 1, wherein said non-uniform velocity coupling comprises a first flanged portion (12) fixedly connected to one end of said camshaft (11) divided, a second flanged portion (16) fixedly connected to said drive shaft (2), said first and second flanged portions (12, 16) opposing to each other to sandwich said annular disc (17) therebetween while permitting the eccentric motion of the center of rotation of said annular disc, a pair of radial grooves (19, 20) each formed at either one of said first and second flanged portions (12, 16) and a pair of pins (23, 24) each rotatably connected to either one of said first and second flanged portions (12, 16) and having a projected pin end fitted into the associated radial groove to form a sliding pair (19, 23; 20, 24) which produces the phase change of said camshaft (11) relative to said drive shaft (2) in response to the eccentric motion of the center of rotation of said annular disc (17).

3. The valve-operating device as claimed in claim 2, wherein said control housing (18) has a circular eccentric-cam hole (27) and a circular bushing support bore (28), and wherein said decentering mechanism comprises a stationary shaft (25) and a rotatable control shaft (26) both arranged parallel to said drive shaft (2), an eccentric bushing (30) rockably supporting said control housing while permitting a rockable motion of said control housing (18) in a direction perpendicular to an axis of said drive shaft (2) and rotatably fitted into said circular bushing support bore (28) so that an inner peripheral surface of said eccentric bushing (30) is rotatably fitted to said stationary shaft (25) and an outer peripheral surface of said eccentric bushing (30) is rotatably fitted to said circular bushing support bore (28), and an eccentric cam (29) fixed to said control shaft (26) so that a center of said eccentric cam (29) is eccentric to a center of said control shaft (26) and rotatably fitted into said circular eccentric-cam hole (27) to produce the rockable motion of said control housing (18) in the direction perpendicular to the axis of said drive shaft (2).

4. The valve-operating device as claimed in claim 3, wherein said control housing (18R) arranged in the right cylinder bank has a symmetric shape about said control housing (18L) arranged in the left cylinder bank, and wherein said control housing (18R) arranged in the right cylinder bank and said control housing (18L) arranged in the left cylinder bank are symmetrical with respect to the line perpendicular to a line segment between and including two central axes of said drive shafts of the two cylinder banks under a particular controlled condition in which the center (O5) of rotation of each of the two opposing annular discs (17L, 17R) arranged laterally in each of the left and right cylinder banks is held in a coaxial position with respect to the center (O6) of said drive shaft (2).

5. The valve-operating device as claimed in claim 4, wherein said control shaft (26R) arranged in the right cylinder bank and said control shaft (26L) arranged in the left cylinder bank rotate in a same direction of rotation when shifting each of the two opposing annular discs (17L, 17R) from said particular controlled condition in which the two opposing annular discs (17L, 17R) are in their coaxial positions.

6. The valve-operating device as claimed in claim 5, wherein said camshaft (11) consists of an intake camshaft being adapted to drive at least one intake valve being arranged toward an inside of each of the left and right cylinder banks, and wherein said control shaft (26) is arranged above the associated camshaft in each of the cylinder banks, and wherein said stationary shaft (25) is disposed between said intake camshaft (2) and an exhaust camshaft (3).

7. The valve-operating device as claimed in claim 6, wherein a predetermined locus of motion of the center (O5) of rotation of said annular disc (17) arranged in each of the cylinder banks is symmetric with respect to a perpendicular line (M) drawn from the center (O6) of said drive shaft (2) to a straight line (O1, O3) including the center (O1) of said stationary shaft (25) and the center (O3) of said control shaft (26) with said annular disc (17) held in the coaxial position.

8. The valve-operating device as claimed in claim 7, wherein an eccentricity of the center (O5) of rotation of said annular disc (17) obtained when rotating said control shaft (26) with a positive phase change of a predetermined angle in a rotational direction under said particular controlled condition in which said annular disc (17) is in the coaxial position, is equal to an eccentricity of the center (O5) of rotation of said annular disc (17) obtained when rotating said control shaft (26) with a negative phase change of the same value as said predetermined angle in the opposite rotational direction under said particular controlled condition.

9. The valve-operating device as claimed in claim 8, wherein an eccentricity of said eccentric cam (29) to the center (O3) of said control shaft (26) is equal to an eccentricity of said eccentric bushing (30) to the center (O1) of said stationary shaft (25) to form a four-link parallel link mechanism in conjunction with said control housing (18), and wherein the center (O5) of rotation of said annular disc (17) is in the coaxial position with respect to the center (O6) of said drive shaft (2) when an eccentric direction of said eccentric cam (29) and an eccentric direction of said eccentric bushing (30) are both perpendicular to said straight line (O1, O3).

10. The valve-operating device as claimed in claim 9, wherein a center (O2) of the outer peripheral surface of said eccentric bushing (30) and a center (O4) of said eccentric cam (29) are both arranged toward an inside of said straight line (O1, O3).

* * * * *